United States Patent
Rode et al.

(10) Patent No.: US 7,356,410 B2
(45) Date of Patent: Apr. 8, 2008

(54) METHOD FOR THE DETECTION AND EXPLORATION OF SUBTERRANEAN HYDROCARBON DEPOSITS BY RECEIVERS OF ACOUSTIC WAVES IN A FREQUENCY RANGE FROM 0.2 TO 30 HZ

(75) Inventors: Ernst D. Rode, Sprè di Povo No. 40, 38050 Povo (IT); Timur Abu-Gazaleh, Passau (DE); Jürgen Moritz, Heidelberg (DE)

(73) Assignee: Ernst D. Rode, Povo (IT)

( * ) Notice: Subject to any disclaimer, the term of this patent is extended or adjusted under 35 U.S.C. 154(b) by 95 days.

(21) Appl. No.: 11/147,692

(22) Filed: Jun. 8, 2005

(65) Prior Publication Data

US 2005/0288862 A1    Dec. 29, 2005

(30) Foreign Application Priority Data

Jun. 9, 2004    (DE)    .................... 10 2004 028 034

(51) Int. Cl.
*G01V 3/00*    (2006.01)
*G01V 1/00*    (2006.01)

(52) U.S. Cl. ........................................... 702/2; 367/40

(58) Field of Classification Search .................... 702/2, 702/12, 13, 14, 16; 181/101, 108, 113, 122; 367/14, 37–40, 43, 50–51
See application file for complete search history.

(56) References Cited

U.S. PATENT DOCUMENTS

| H1561 H | * | 7/1996 | Thompson | ................... 367/188 |
|---|---|---|---|---|
| 6,442,489 B1 | * | 8/2002 | Gendelman et al. | ........... 702/12 |
| 6,473,695 B1 | * | 10/2002 | Chutov et al. | ................... 702/2 |
| 6,801,473 B2 | * | 10/2004 | Matteucci et al. | ............. 367/47 |
| 6,985,815 B2 | * | 1/2006 | Castagna et al. | .............. 702/14 |

FOREIGN PATENT DOCUMENTS

DE    199 15 036 A1    10/2000

OTHER PUBLICATIONS

Barzandji et al., Hydrocarbon Reservoir Detection Using Acoustic/Seismic Spectroscopy Method, 2002, SPE 77955.*
Westervelt, Journal of the Acoustical Society of America, vol. 35, No. 4, Apr. 1963, pp. 535-537.

* cited by examiner

*Primary Examiner*—Michael Nghiem
*Assistant Examiner*—Toan M. Le
(74) *Attorney, Agent, or Firm*—Collard & Roe, P.C.

(57) ABSTRACT

The invention relates to a method for the detection and exploration of subterranean hydrocarbon deposits by receivers of acoustic waves in a frequency range from 0.2-30 Hz arranged at or near the surface, whereby, according to the invention, acoustic signals are recorded for a period of time T, subjected to a frequency analysis in time windows shifted by a period of time $\Delta t$, according to which each time window is subdivided into frequency channels and at least two frequency groups and then the amplitude values of the frequency channels of the frequency groups are correlated and the time deviation $\tau$ is determined for the first peak of the correlation function that is unequal to zero, and the ratio of the variation of the amplitude values of the peaks of the frequency groups from one time window to at least one other is determined for this time deviation $\tau$ and used to derive the magnitude of the hydrocarbon deposit, and the depth is calculated from the time deviation $\tau$.

20 Claims, 3 Drawing Sheets

METHOD FOR THE DETECTION AND EXPLORATION OF SUBTERRANEAN HYDROCARBON DEPOSITS BY RECEIVERS OF ACOUSTIC WAVES IN A FREQUENCY RANGE FROM 0.2 TO 30 HZ

CROSS REFERENCE TO RELATED APPLICATIONS

Applicants claim priority under 35 U.S.C. § 119 of German Application No. 10 2004 028 034.7 filed Jun. 9, 2004.

A number of different geophysical, geological, and geochemical methods are utilized in the exploration of hydrocarbon deposits.

Of all known methods, the classical seismic reflection method plays a predominant role. The seismic reflection method is capable of detecting structures under certain conditions and, under certain conditions, yields information regarding the nature of the reflector and its properties.

However, a direct information concerning the presence or non-presence of hydrocarbons in detected structures is not provided, which is mainly a consequence of the basic concept of the classical seismic reflection method and the signal waves employed.

However, some seismic methods are known which utilize acoustic/seismic spectral analysis to yield direct information concerning the presence or non-presence of hydrocarbons within a structure. Methods of this type are known from the printed patent specifications, DE 199 15 036 A1 and U.S. Pat. No. 6,442,489 B1.

These methods are mainly of a passive nature, i.e. they work without external signal sources and analyze the natural noise of the earth. These methods work on the basis of a spectral analysis of low frequency signals in the range of approx. 0.5 to 8 Hz received by highly sensitive seismometers on the surface. The spectral change of the noise of the earth measured is based on the fact that in a hydrocarbon reservoir, which corresponds to a multi-fluidic system in a porous body, a conversion of higher frequency portions of the acoustic spectrum to lower frequency portions is caused (Westervelt, Journal of the Acoustical Society of America, vol. 35, no. 4, April 1963). This behavior of the hydrocarbon deposit is caused by the deposit being a band-pass filter with very low cut-off frequencies and non-linear transmission behavior. The non-linear transmission behavior causes the conversion of higher frequency portions. This behavior leads to the generation of mixed products of the higher frequency portions of the acoustic noise of the earth and upper harmonic waves of the mixed products.

An electrical analogue is known. "Modulation" and "non-linear distortion factor" are analogous terms.

A known term used in electrical signal processing to describe the behavior of a non-linear transmission element with regard to the ratio of the amplitudes of the mixed product of two signals differing in frequency is "mixed steepness" or "conversion transductance" which shall be used synonymous hereinafter.

The known methods for acoustic analysis of signals of this type above a petroleum deposit utilize the transmission behavior of the reservoir and its conversion properties and, deviating from the suspected distribution profile of the earth spectrum, the appearance of the mixed products yields information concerning the presence or non-presence of a hydrocarbon reservoir.

Qualitatively, this information is (almost) correct, since, if the observed spectral deviations can be related unambiguously to the transmission properties of the hydrocarbon deposits, the measure of the amplitudes in the area of the spectral deviation provides at least some qualitative information in favor of the presence of a hydrocarbon deposit.

However, these known methods are associated with two disadvantages:

1. The absolute magnitude—or "spectral power" of the spectral component measured cannot be utilized as such, since it is always dependent on the amplitude of the acoustic waves entering the reservoir. Therefore, the magnitude of the spectral components and its deviation from the spectra outside of the hydrocarbon deposit provide at most some information regarding the presence or non-presence of hydrocarbons to be derived, but fail to provide unambiguous, quantitative information.

However, qualitative information for an extended period of time, e.g. a period of 40 minutes, could be obtained from the summary spectra measured.

2. The information obtained in the known methods of low frequency acoustic spectroscopy according to which "characteristic" spectral lines can be assigned to a hydrocarbon deposit, is incorrect, if not outright false.

The pooled spectrum measured over a period of 40 min and spectra measured over such periods of time are relatively stabile, but they only reflect products generated at a band-pass filter with very low cut-off frequencies [0.5-8] Hz showing strongly non-linear transmission behavior in the pass-range.

Superimposed on this picture are low frequency portions of transients or surface-bound natural or man-made acoustic phenomena.

In summary, a quantitative statement concerning a hydrocarbon deposit can basically not be made and a qualitative statement only with a considerable degree of "interpretation".

The present invention aims to avoid the disadvantages mentioned above and utilizes the spectral variation and the influences of the unstable surface noise in order to derive therefrom independent quantitative information concerning the magnitude of the hydrocarbon deposit. Moreover, the method to be applied according to the invention provides information concerning the depth of the deposit, which is not possible in the same fashion with the existing methods.

Figure 1:
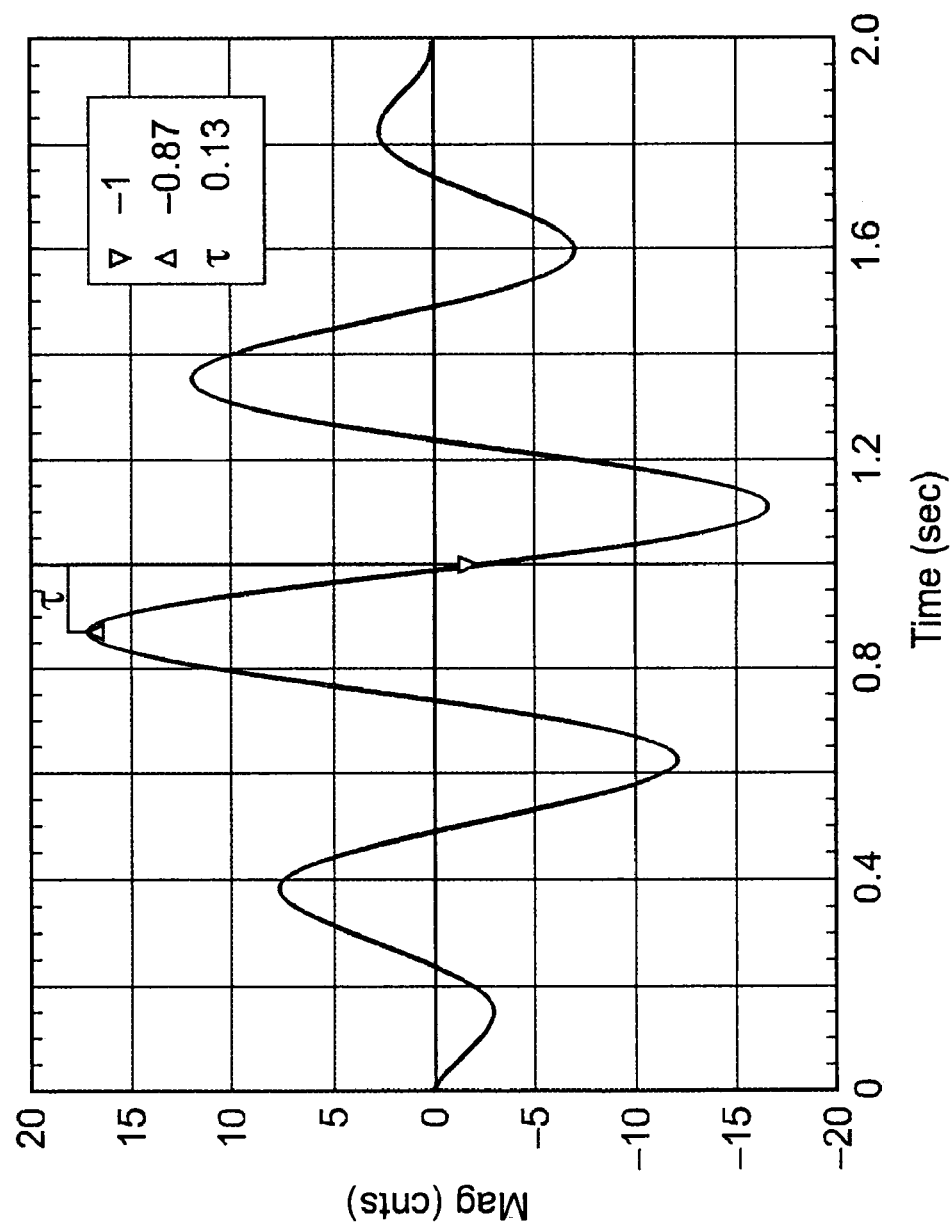
FIG. 1 shows a correlation function and the time shift $\tau$ of the first peak of the correlation function.

This task is solved by a method with the features according to claim 1.

Advantageous embodiments of the method are detailed in the dependent claims.

According to the invention, it is presumed that different surface waves of any type also generate compression waves, which reach a reservoir located below the measuring point. The higher frequency portions of waves of this type are converted in the reservoir, which corresponds to a band-pass filter with low frequency cut-off frequencies of approx. 0.5 to 8 Hz and a non-linear transmission function, into mixed products with frequencies which are exclusively in the pass curve of the band-pass filter.

The following simplified relationship then applies to the change of the converted waves in the area of low frequencies (variation) and the changes of the incident waves in the area of higher frequencies $$\Delta P_1[1,6] = S \cdot P_2[12,28] \tag{1}$$

whereby $\Delta P_1[1,6]$ is the variation of a peak of the frequency portions in the interval [1,6] Hz over a period of time $\Delta t$, and $\Delta P_2[12,28]$ is the variation of a peak of the frequency portions in the interval [12,28] Hz over a period of time $\Delta t$, whereby S is the ratio or the variation of the amplitude values or the "mixed steepness" or "conversion transductance".

The conversion transductance S in turn is proportional to the magnitude of the hydrocarbon deposit under an acoustic receiver that is located at the surface, e.g. a seismometer, and the following relationship applies $$S = k \cdot NPZT \tag{2}$$

whereby k is a proportionality factor and

NPZT=Net Oil Pay Zone Thickness.

k can be determined either on existing wells or, in the case of exploration wells, an experimental value known from experience is assumed for k as a first approximation, which corresponds to the constant known from known and geologically similar deposits, which is quite sufficient as a first approximation for practical application.

In order to get to equation (1), the following route is proposed according to the invention to serve as an example:

1. Using a highly sensitive seismometer, preferably a 3-component seismometer, acoustic (seismic) signals in the frequency range between approx. 0.5 and 30 Hz are recorded on the surface above a hydrocarbon reservoir. The recording is made for an extended period of time of e.g. 40 minutes or even longer.
2. The analog signals thus recorded are then digitized in common fashion using an A/D converter and stored in a data memory. The sampling rate of the A/D converter is at least 100 samples per second (sps).
3. The data is then subjected to a Fourier analysis with a time window of e.g. 30 seconds each, which is determined in steps of 0.01 seconds for the entire recording period.
4. Each of the 30-second windows in the frequency space considered is then subdivided into channels with a width of e.g. 0.2 Hz:
   In the [1,6] Hz interval, one obtains 25 channels and, from the integral over all channels, 25 numerical values for each time window.
   In the [12,28] Hz interval, one obtains 80 channels and, from the integral over all channels, 80 numerical values for each time window.

Over the 40 minutes of recording time, one then obtains a one-dimensional array for each frequency channel including (2400-30) · 100=237,000 numerical values (elements), whereby the measuring period is 2400 seconds and the width of the window is 30 seconds. The windows are shifted by 0.01 (one hundredth of a) second until the end of a window reaches the 2400 mark, i.e. the shifting period is (2400-30) seconds and results in (2400-30)×100 individual windows or numerical values or elements of the array.

Or generally, an array with $(T-t_F) \cdot SR = N$ whereby

T is the recording period $t_F$ is the length of the window

SR is the sample rate and

N is the number of elements in an array.

5. Each of the arrays g from the [1,6] interval is then correlated to each array h from the [12,28] interval (cross-correlation) and this is done over all time-shifted 30-second windows in accordance with:

$$Corr(g, h)_j = \sum_{k=0}^{N-1} g_{j-k} x h_k$$

whereby j is 1 to 2N−1 whereby N is the length of the two arrays.

6. Moreover, a condition is now being introduced that must be met obligatorily in order to demonstrate the presence of a hydrocarbon deposit. The time shift, τ, of the first peak of the correlation function starting from the "middle" of the correlation function must be unequal to zero or $\tau \emptyset \epsilon$ must even be true, whereby ϵ is a predetermined cut-off value of e.g. 0.1 seconds, see FIG. 1.

The "middle" of the correlation function is defined as follows $$\text{corr}(g,h)_i \text{ with} \tag{4}$$

whereby i=(2N−1)÷2

The rationale behind this condition is as follows: in order to determine from the variation of the frequency channels [1,6] and [12,28] the conversion transductance, the frequency portions in the [1,6] interval present approximately on the surface must be separated from the portions generated in the reservoir in the form of mixed products of higher frequency portions from the [12,28] interval by means of conversion.

Figure 2:
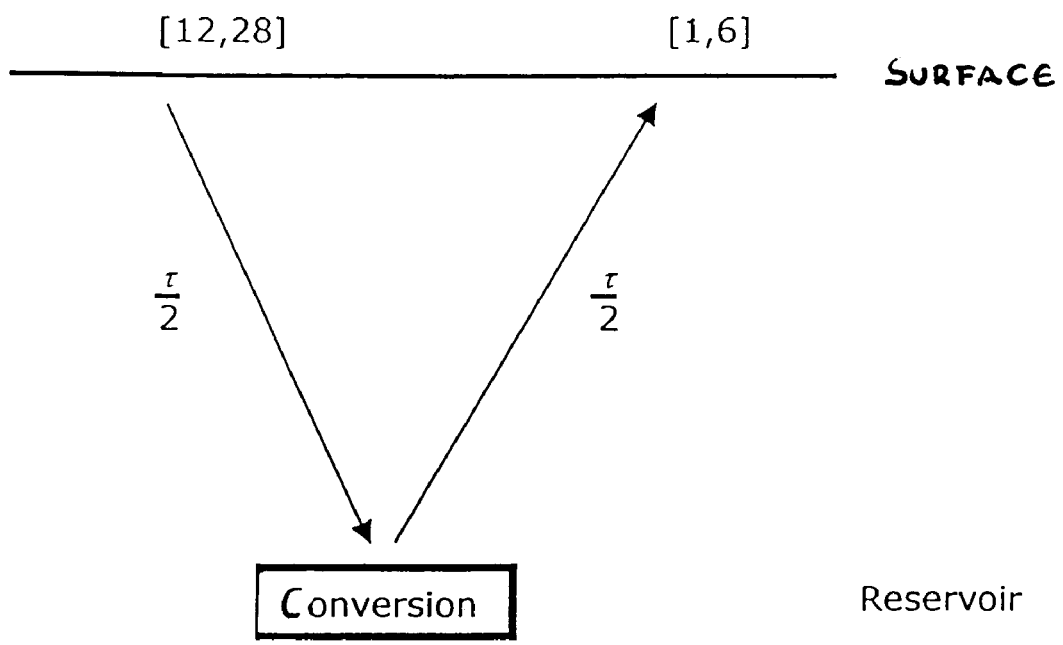
FIG. 2 illustrates a schematic diagram of the runtime of a seismic signal.

Consequently, a reasonable correlation of the variation of values from the two frequency ranges needs to be sought only where there is a time shift, which then corresponds to the run time of the signal (see FIG. 2).

By means of this obligatory condition one obtains according to the invention, basically as a side product, some additional and very important information: from the time shift of the peak of the correlation function towards zero (the "middle" as per the definition above) one obtains some information concerning the signal run time of the signal and therefore some information concerning the depth of the reservoir.

If, for example, the run time of the signal is 2000 m/sec and the deviation of the peak of the correlation function is 1 sec, the reservoir is at a depth of 1,000 meters.

Moreover, another information is obtained: if the correlation function were to have multiple peaks over a "reasonable" time shift, the time deviation of each could be used to conclude that the hydrocarbon deposit has multiple horizons, and from the corresponding relationships of the variations of the amplitudes one obtains the magnitude of the various horizons.

7. The mutually correlated peaks of the two frequency ranges are stored in the form of coordinate couples $(m_1, m_2)$.

A linear regression is then calculated over all these coordinate couples ($m_1$, $m_2$) as follows $$y = C_0 + C_{1x} \quad (5)$$

from which a regression line is obtained in common fashion.

The slope C1 of this regression line corresponds to the conversion transductance S and, according to the invention, according to (2) provides an information concerning the magnitude of the reservoir horizon assigned to the time shift, $\tau$.

Figure 3:
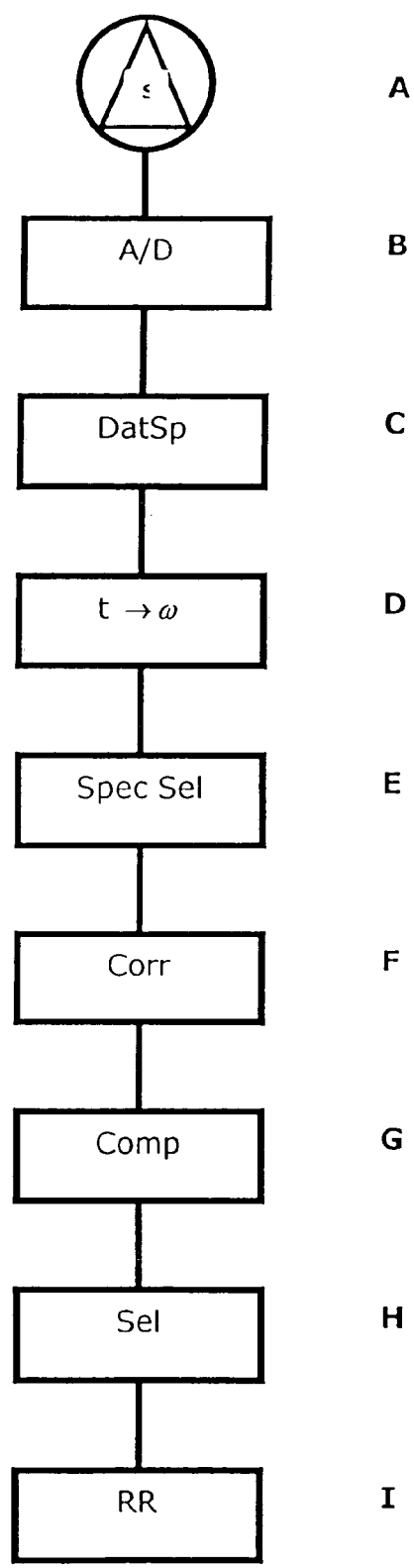
FIG. 3 shows several steps of a method for detection of hydrocarbon deposits according to an embodiment of the invention.

The procedural steps of the method according to the invention are shown in an exemplary fashion in FIG. 3, in which:

A=seismometer
B=analog-digital converter
C=intermediate memory
D=time-frequency transformer (e.g. Fourier transformation)
E=spectral generator for selecting and dimensioning the frequency channels
F=correlator for correlating all selected frequency channels
G=comparator for determining the time shift $\tau$ of the peaks of the correlation function
H=selector for selecting the number couples of the amplitude variation of the mutually assigned frequency channels corresponding to $\tau$
I=regression calculator for determining the conversion transductance.

The proposed method, whose results are based on actual measuring results, is suitable to provide a solution to a problem that could not be solved by previously known geophysical methods for the exploration and monitoring of hydrocarbon deposits, namely the quantitative determination of their magnitude, the determination of their depth, and the distinction between different horizons.

The application of this passive method from the surface of the earth is ecologically reasonable (since it is non-invasive) and the option of quantitative determination leads to a much better yield of existing deposits and thus affords a significant economic advantage.

With regard to major bodies of water, hydrophones or semi-immersed hydrophones can be used. This method can be applied also just with electromagnetic receivers or in combination with other acoustic receivers.

The invention claimed is:

1. Method for detection and exploration of subterranean hydrocarbon deposits by receivers of acoustic waves in a frequency range from 0.2 to 30 Hz arranged at or near a surface, comprising:
    recording acoustic signals for a period of time T;
    subjecting the recorded acoustic signals to a frequency analysis in time windows shifted by a period of time $\Delta t$ according to which each time window is subdivided into frequency channels having at least two frequency groups;
    correlating the amplitude values of the frequency channels of the frequency groups and determining the time deviation $\tau$ for a first peak of the correlation function that is unequal to zero; and
    calculating a depth of a subterranean hydrocarbon deposit based on the time deviation $\tau$.

2. Method according to claim 1,
    wherein the ratio S or the conversion transductance S of the variation of the amplitude values is determined according to $$S = \frac{\Delta P_1[1, 6]}{\Delta P_2[12, 28]}$$

whereby S is proportional to the magnitude of the hydrocarbon deposit below the acoustic receiver, whereby $\Delta P_1[1, 6]$ is the variation of a peak of the frequency portions in the [1,6] Hz interval in the period of time, $\Delta t$, and $\Delta P_2[12,28]$ is the variation of a peak of the frequency portions in the [12,28] Hz interval in the period of time, $\Delta t$, and the magnitude of the hydrocarbon deposit is determined in accordance with the relation NPZT=S/k, whereby NPZT="Net Oil Pay Zone Thickness" and k is a proportionality factor.

3. Method according to claim 1, wherein, for a predetermined time deviation $\tau(i=1$ to $n)$, the peaks of the frequency channels that can be correlated are determined by stepwise iteration from various time windows.

4. Method according to claim 1,
    wherein one-dimensional acoustic receivers are used to record the signals.

5. Method according to claim 1,
    wherein three-dimensional acoustic receivers are used to record the signals.

6. Method according to claim 1,
    wherein hydrophones, which are semi-immersed or arranged on the sea floor, are used as acoustic receivers.

7. Method according to claim 1,
    wherein electromagnetic receivers are used in addition or alternatively.

8. Method according to claim 1,
    wherein the signal processing is done off-line for a predetermined period of time.

9. Method according to claim 1,
    wherein the signal processing is done continuously online with the processing time being predetermined.

10. Method according to claim 1,
    wherein one or multiple seismometers, whose signals are processed in a synchronous or asynchronous fashion, are used as acoustic receivers.

11. Method for detection and exploration of subterranean hydrocarbon deposits by receivers of acoustic waves in a frequency range from 0.2 to 30 Hz arranged at or near a surface, comprising:
    recording acoustic signals for a period of time T;
    subjecting the recorded acoustic signals to a frequency analysis in time windows shifted by a period of time $\Delta t$ according to which each time window is subdivided into frequency channels having at least two frequency groups;
    correlating the amplitude values of the frequency channels of the frequency groups and determining the time deviation $\tau$ for a first peak of the correlation function that is unequal to zero; and
    determining a ratio of the variation of the amplitude values of the peaks of the frequency groups from one time window to at least one other for this time deviation $\tau$ and using the ratio to determine a magnitude of the hydrocarbon deposit.

12. Method according to claim 11,
    wherein the ratio S or the conversion transductance S of the variation of the amplitude values is determined according to $$S = \frac{\Delta P_1[1, 6]}{\Delta P_2[12, 28]}$$

whereby S is proportional to the magnitude of the hydrocarbon deposit below the acoustic receiver, whereby $\Delta P_1[1,6]$ is the variation of a peak of the frequency portions in the [1,6] Hz interval in the period of time, $\Delta t$, and $\Delta P_2[12,28]$ is the variation of a peak of the frequency portions in the [12,28] Hz interval in the period of time, $\Delta t$, and the magnitude of the hydrocarbon deposit is determined in accordance with the relation NPZT=S/k, whereby NPZT="Net Oil Pay Zone Thickness" and k is a proportionality factor.

13. Method according to claim 11, wherein, for a predetermined time deviation $\tau(i=1$ to $n)$, the peaks of the frequency channels that can be correlated are determined by stepwise iteration from various time windows.

14. Method according to claim 11,
wherein one-dimensional acoustic receivers are used to record the signals.

15. Method according to claim 11,
wherein three-dimensional acoustic receivers are used to record the signals.

16. Method according to claim 11,
wherein hydrophones, which are semi-immersed or arranged on the sea floor, are used as acoustic receivers.

17. Method according to claim 11,
wherein electromagnetic receivers are used in addition or alternatively.

18. Method according to claim 11,
wherein the signal processing is done off-line for a predetermined period of time.

19. Method according to claim 11,
wherein the signal processing is done continuously online with the processing time being predetermined.

20. Method according to claim 11,
wherein one or multiple seismometers, whose signals are processed in a synchronous or asynchronous fashion, are used as acoustic receivers.

* * * * *